United States Patent Office 2,739,923
Patented Mar. 27, 1956

2,739,923

PRODUCTION OF CITRIC ACID BY SUBMERGED FERMENTATION

Stanley M. Martin, Ottawa, Ontario, Canada, assignor to National Research Council, Ottawa, Ontario, Canada, a body corporate of Canada No Drawing. Application August 11, 1952,
Serial No. 303,844

17 Claims. (Cl. 195—36)

This invention relates to the production of citric acid by submerged fermentation of molasses, e. g. beet, cane or citrus molasses.

For many years citric acid has been produced by fermentation of molasses using, as fermenting agents, any of the citric acid producing organisms or fungi such as the genera Aspergillus, Penicillium, and Nucor. Examples of useful species of these genera are *Aspergillus niger, Aspergillus ventii, Aspergillus clavatus, Aspergillus leuchensis, Penicillium citrium, Penicillium luteum,* and *Mucor piriformis*. The species which has been found most useful is *Aspergillus niger*.

Up to now, the main commercial method has used surface fermentation, that is, the method in which the liquid fermentation medium is spread out in shallow pans and the fermentation is carried out only on the surface of the medium. This method has obvious disadvantages. For example, to obtain a reasonable commercial yield, a large area of pans is required which involves a great expense and a large area of plant. Furthermore, a great deal of labour is required to service these pans.

It has been realized that these disadvantages would be avoided by the use of a submerged fermentation method, i. e. a method in which the fermentation is carried on throughout the whole fermentation medium rather than on the surface only. Extraordinary difficulty has, however, been found in attempting to obtain fermentation below the surface. Considerable research has been applied to this problem and a number of suggestions have been made. In many cases, submerged fermentation has been achieved and reasonable conversions obtained, but up to now the rates of the conversion have been of the order of 70% conversion in 8 days. Such conversion rates have evidently not proved generally acceptable in commerce since plants are still being erected for the production of citric acid by the surface fermentation method in spite of the great disadvantages involved. Furthermore, many of the submerged methods suggested require the molasses to be refined before use and this renders such methods less practicable.

It is the object of the present invention to provide a submerged fermentation method which is commercially practicable in that useful rates of conversion may be obtained and unrefined molasses used as starting material.

The process, according to the present invention, comprises three phases, the first phase comprising preparing an inoculum by germinating spores of a citric acid producing and accumulating organism in a seed mash; the second phase comprising transferring at least part of the inoculum to a main mash and effecting the requisite growth of the organism therein; and the third phase comprising retarding further growth of the organism by a positive process step and promoting fermentation in the same main mash.

The term "requisite growth" is used to indicate the growth required to effect useful citric acid producing fermentation. The required degree of growth is well known in the arts and may be effected by aerating the main mash until this degree of growth is obtained. If oxygen is then substituted for the air, the growth of the organism will be greatly retarded and fermentation will be promoted. The oxygenation may then be continued until the desired degree of citric acid production is obtained. The terms "aeration" and "oxygenation" are therefore used to indicate quite distinct operations having totally different purposes. It is to be stressed therefore that the former term is limited to the use of air and the latter term to the use of commercially pure oxygen.

The three phases of the present invention form a simple and practicable process which gives useful rates of conversion and is believed to be entirely novel, particularly in its stress on the retardation of the organism growth by a positive step and the consequent promotion of fermentation without appreciable delay.

In the preferred form, the process comprises preparing a seed mash by diluting molasses with water, adjusting the pH to 5–8, treating with a water soluble ferrocyanide with heat, and cooling; preparing an inoculum by inoculating the seed mash with spores of a citric acid producing and accumulating organism and allowing to incubate with agitation in the presence of air at least until the spores have germinated; preparing a main mash by diluting molasses, adjusting the pH to 6–9, treating with a water soluble ferrocyanide with heat, and cooling; adding at least a portion of said inoculum to the main mash; dispersing air throughout the main mash until the requisite growth of the said organism is obtained; and then dispersing oxygen throughout the main mash until the desired degree of citric acid production is obtained. Many of these steps have previously been suggested per se in connection with submerged fermentation or surface fermentation, but this particular combination, embodied in the aforementioned three phases, has never previously been suggested in either type of fermentation and produces an improved rate of conversion which is quite surprising considering the poorer rate of conversion obtained with previous processes suggested containing some of these steps.

Improved results are obtained by imposing a number of limitations on the above broadly stated process steps of the preferred form. For example, it is preferable that both mashes are sterilized before inoculation. In the case of the main mash, this term "inoculation" refers to the addition of the inoculum. By "sterilization" is generally meant commercial sterilization in which all or substantially all of the undesirable organisms are destroyed but some harmless organisms remain viable.

In the preparation of the seed mash, the molasses are preferably diluted to a concentration of 8–20% sugar by weight to give best results. Furthermore, the treatment with the ferrocyanide is preferably in conjunction with a temperature of at least 80° C. The action of the ferrocyanide is not clear, but it is thought that it serves in fact to make impurities such as iron less available since a precipitate containing inter alia iron is produced. The ferrocyanide treatment per se has been suggested before, and precautions have previously been taken to exclude the precipitate since it was thought to be harmful. It has been found with the present invention that this precipitate need not be removed. Heat is, however, necessary to effect the actual ferrocyanide treatment. The ferrocyanide may either be added to the cold mash and the mash then heated, or the ferrocyanide can be added to a hot mash. In the preferred form of the invention, the ferrocyanide is added to the cold mash and the mash is then sterilized under heat so that sterilization and ferrocyanide treatment are effected simultaneously.

It may be found that sterilization will alter the pH to which the mash has been adjusted and, in this case, the pH of each mash may be readjusted after sterilization to within the range stated for each mash. More consistent results are obtained if a more limited pH range is used than stated above for each mash, i. e. for the seed mash a pH of 5.5–6.5 and for the main fermentation mash a pH of 7.5–8.5.

The proportion of ferrocyanide ion used is preferably 0.15–0.5 gm. per litre of the respective mash. For example potassium ferrocyanide may be used in the proportion of 0.26–0.87. These two proportion ranges do not take into account any water of crystallization, the potassium ferrocyanide being often used in the form of the trihydrate.

It is well known in the art to add nutrient salts and, in the present invention, a water soluble phosphate is preferably added to each mash prior to inoculation.

As regards the agitation in the presence of air during the preparation of the inoculum, it has been found sufficient to agitate the mash in a mechanical shaker, air diffusing into the flask from the atmosphere being sufficient to effect incubation. Alternately, air may be bubbled through the mash in such a manner as to cause agitation at the same time as aeration. The incubation is preferably effected for 18–30 hours at 20–35° C.

The concentration of spores in the seed mash is important if optimum results are to be achieved. It has been found that the preferred concentration of spores is $6\text{--}10 \times 10^8$ spores for every 300 ml. of mash.

The proportion of inoculum added to the main mash is not critical, but, generally speaking, the less inoculum used in commercial practice the better. It has been found that up to 10% by volume of the inoculum added to the main mash is a suitable proportion.

The steps of dispersing air and then dispersing oxygen throughout the main mash are important and should be effected carefully so that all portions of the mash are fed with the air and then the oxygen. It has been found that the introduction of the air and then the oxygen through an aeration disc at the bottom of the fermentation vessel produces a fine dispersion which is suitable. The air promotes growth of the organism and, generally speaking, this organism growth is preferably continued until medium sized pellets are obtained, e. g. about 1–2 mm. in diameter, which are creamy white, smooth, and gravelly to the touch. This may be effected by aeration for 18–30 hours at 20–35° C. When sufficient growth of the organism has been obtained, oxygen is substituted for the air and citric acid production and accumulation is thereby promoted while further growth of the organism is greatly retarded. The aeration and oxygenation together may last between 60 and 80 hours starting from the addition of the inoculum to the main mash.

The above preferred ranges of conditions apply generally to all citric acid producing organisms and all types of molasses. The optimum results can be obtained by co-ordinating the various steps within the preferred ranges of conditions. Suitable sets of co-ordinated conditions are illustrated in the following examples:

EXAMPLE 1

Preparation of the seed mash

Chatham sugar beet molasses, 1951 crop, are diluted to approximately 12% by weight sugar with tap water. This solution or mash is then adjusted to a pH of 6.0 with 50% hydrochloric acid. 1500 ml. of this mash is then transferred into a 4-litre beaker and 0.4 gm.

$$K_4Fe(CN)_6 \cdot 3H_2O$$

in the form of a 10% aqueous solution, is added per litre of mash.

The beaker is then transferred to an autoclave in which the mash is sterilised for 25 minutes at 15 pounds pressure. The mash is then allowed to cool at room temperature. The precipitate formed is not removed. It is then found that the pH of the mash has risen to 7.5 and further 50% hydrochloric acid is added to readjust the pH to 6.0.

300 ml. of the mash is then transferred into each of a number of 1-litre Erlenmeyer flasks which have previously been sterilized, and 0.5 gm. $K_2HPO_4 \cdot 3H_2O$ in the form of a sterile 5% aqueous solution is added per litre of mash.

Preparation of the spores

The citric acid producing and accumulating organism used is strain N. R. C. A-1-233 (see National Research Council Publication No. 2359), otherwise termed University of Wisconsin strain 72–4, of *Aspergillus niger* maintained in soil stocks. For use, this culture is transferred serially four times on a synthetic medium in a known manner. To the mature spores from the fourth culture (6 days old) in bottle plates is added to each plate 10 ml. of a sterile 0.05% aqueous solution of the wetting agent sold under the registered trade mark "Aerosol O. T." The spores are wetted and washed off by tipping the plate back and forth 25 times. The suspension is then poured off.

Each plate is then washed using 35 ml. of sterile water which is tipped back and forth over the plate 25 times and the resulting suspension poured off.

The two suspensions thus obtained are then combined and made up to 100 ml. with sterile water. The combined suspension is then shaken 100 times with a few glass beads to break up clusters and it is found that the final suspension contains about $0.55 \times 10^8$ spores per ml.

The number of spores was estimated by counting using a Howard mould counting chamber. This count is then related to the optical density as determined in an Evelyn colorimeter using a $540\mu$ M filter. In both the counting procedure and the determination of optical density it is necessary to make suitable dilution of the suspension before proceeding.

Preparation of the inoculum

The seed mash as prepared above is inoculated with the said spore suspension to a concentration of $9 \times 10^8$ per 300 ml. of mash. Incubation is then allowed to take place in the agitator, sold by the B. F. Gump Company under the name "2030 Bar-Nun," at 158 R. P. M. and at a temperature of 28° C., in the presence of lard oil as antifoam agent.

After 16 hours, macro- and microscopic observations of the culture are begun, and these observations are repeated every hour until the desired stage of development is attained. To obtain optimum results, the stage of development should be such that the seed possesses the following characteristics:

1. Macroscopic:
    (a) Many small individual colonies about 0.2 to 0.5 mm. in diameter.
    (b) A free flowing mash.
    (c) Some clearing of the mash by trapping of the precipitated matter in the pellets.

2. Microscopic:
    (a) Pellets well separated one from another with a minimum of fusion.
    (b) Spherical, dense pellets with limited lateral hyphae and with much precipitate enmeshed in the pellet.
    (c) Individual hyphae short, greatly thickened, vacuolated, and granular, with short club-like branches and with particles of precipitate adhering to the hyphae.

These characteristics are obtained in the present case after 22 hours of incubation.

Preparation of the main mash

The main mash is prepared in a similar manner to the seed mash except that a different pH adjustment is used.

Chatham sugar beet molasses, 1951 crop, are diluted to 12% by weight sugar with tap water, and adjusted to a pH of 8.0 with 50% hydrochloric acid. The addition of potassium ferrocyanide, the sterilization, and the cooling are effected under the same conditions as described above in connection with the seed mash. The pH is then readjusted to 8.0 with 50% hydrochloric acid and the potassium phosphate is added under the same conditions as described above in connection with the seed mash. As with the seed mash, the precipitate formed by the potassium ferrocyanide treatment is not removed.

Two and one half litres of this mash is transferred to each of a number of Pyrex (registered trade mark) glass, "tower" type fermenters of diameter 6 cm. and height 150 cm., each fermenter being equipped with a medium-porosity, sintered Pyrex (registered trade mark) glass, aeration disc of 12 cm.$^2$ area. A column of the liquid mash in the fermenter is thus produced of about 100 cm. high with a surface area of about 28 cm.$^2$.

The mash is then oxygenated for 2 hours through the aeration disc at a rate of 100 ml. of oxygen per minute. This preliminary oxygenation ensures oxygen saturation, probably serves to oxidize any readily oxidizable compound present, and helps to combat the severe foaming which will occur during fermentation.

Secondary growth stage

After the preliminary oxygenation of the mash, 2% by volume of the above described inoculum is added to the mash in the fermenter. Moistened compressed air is then passed through the aeration disc commencing at a rate of about 100 ml. per minute and increasing during the first hour to a final rate of 500 ml. per minute. Aeration is continued for 24 hours and considerable growth of the culture takes place during this time.

Fermentation

Aeration is then ceased and the mash is then oxygenated at a rate of 500 ml. per minute for a further 46 hours, making a total fermentation time of 70 hours.

The fermentation products are analysed and the percentage conversion calculated as the fraction $$\frac{\text{gm. citric acid} \times 100}{\text{gm. available sugar}}$$

On this basis the percentage conversion is found to be 72% which, in 70 hours, gives a rate of conversion of 1.03% per hour. The conversion is based on anhydrous citric acid. This rate compares very favourably with the rates of conversion obtainable with previously suggested processes which rates, as already stated, are of the order of 70% conversion in 8 days, i. e. about 0.35% per hour.

The severe foaming experienced during fermentation is controlled satisfactorily by the addition of 2 ml. of octadecanol (3% in paraffin oil) to each fermenter, by the addition of lard oil as required during the fermentation, and by mechanical foam breakers.

As regards the appearance of the main mash in the course of the secondary growth stage and the fermentation, during the period of about 12 to 18 hours after inoculation of the fermenters, the small pellets (about 0.75 to 1.0 mm. in diameter) begin to aggregate into loose flocculent masses. By this time the mash begins to clear and appears wine colored by transmitted light. After about 18 hours the aggregates break up and individual hard, smooth pellets begin to form. During this time there is an increase in foaming and, if the air flow is stopped, the pellets rise to the top. After about 30 hours serious foaming ceases and the pellets tend to settle out if the oxygen supply is shut off. By this time growth has practically ceased. Washed pellets taken from this stage or later are creamy white, smooth, gravelly to the touch, and of medium size (about 1.0 to 2.0 mm. in diameter). The size of inoculum used in the fermenters is preferably such that fully developed pellets are allowed free movement in the mash. On settling, the pellets preferably occupy between ¼ and ⅓ of the total volume.

As previously stated, this example illustrates a co-ordination of the conditions of the various steps so as to achieve optimum results. Other sets of conditions can be obtained which also give optimum results provided that the various conditions are maintained in balance. For example, increase of pH decreases the rate of development but may be counteracted by increase in the spore concentration which tends to increase the rate of development. Generally speaking the following may be stated:

1. Increase of pH decreases the rate of development.
2. Increase in the amount of ferrocyanide added decreases the rate of development.
3. Increase of spore concentration increases the rate of development.
4. Increase in aeration increases the rate of development.
5. The phosphate appears to minimize the effect of the ferrocyanide and this must be taken into consideration when attempting to obtain optimum conditions.

EXAMPLE 2

Five fermentations are carried out under the same conditions specified in Example 1 except that the Chatham molasses are 1947 crop, the potassium ferrocyanide is added in the proportion of 0.8 gm. per litre of the seed mash, and 0.7 gm. per litre of the main mash, and the potassium phosphate is added in the proportion of 0.5 gm. per litre of each mash. The aeration and oxygenation, together last for only 61 hours.

The following table is the result obtained in each fermentation:

Table I [a]

| Fermenter | Total acid in product, percent | Anhydrous citric acid in product, percent | Conversion of available sugar to anhydrous citric acid, percent | Sugar utilized, percent |
|---|---|---|---|---|
| 1 | 8.4 | 6.8 | 56.0 | 95.3 |
| 2 | 8.3 | 6.8 | 55.8 | 95.3 |
| 3 | 8.0 | 6.6 | 54.4 | 95.3 |
| 4 | 8.6 | 7.0 | 57.0 | 95.3 |
| 5 | 9.2 | 7.1 | 58.2 | 95.3 |

[a] All values corrected for evaporation.

Total acid in the product is determined by titration of 1 ml. samples, to the phenolphthalein end-point with 0.1 sodium hydroxide and is expressed as anhydrous citric acid.

Citric acid is determined colorimetrically by the method of Saffran and Denstedt (J. Biol. Chem., 175, 849 (1948)) and is expressed as anhydrous citric acid.

The percentage conversion is calculated as described in Example 1.

The last column indicates the sugar which was actually utilized in the fermentation as opposed to the total available sugar which is used in the calculation of percentage conversion. The sugar utilized is given as a percentage of the total available sugar.

EXAMPLE 3

Two pairs of fermentations, the fermentations of each pair being identical, are carried out under the conditions described in Example 1, except that one pair of fermentations is effected with Chatham 1947 molasses and the other pair of fermentations is effected with Chatham 1949 molasses. The other exceptions to the conditions outlined in Example 1 are that the potassium ferrocyanide is added to the seed mash in the proportion of 0.8 gm. per litre, the potassium ferrocyanide is added to the main mash in the proportion of 0.5 gm. per litre, the potassium phosphate is added to the seed mash in the proportion of 0.5 gm. per litre, and the potassium phosphate is added to the main mash in the proportion of 0.13 gm. per litre. Furthermore, the inoculum is added to the main mash in the proportion of 8% by volume and the aeration and oxygenation together last 78 hours.

The following table illustrates the results obtained, the figures being calculated on the basis outlined in Example 2:

Table II [a]

| Molasses sample | Total acid in product | Anhydrous citric acid in product | Conversion of available sugar to anhydrous citric acid | Sugar utilized |
|---|---|---|---|---|
| Chatham 1947 | 10.9 | 8.6 | 70.7 | 93.0 |
| Chatham 1949 | 9.4 | 8.6 | 66.0 | 93.0 |

[a] Each value is the average of two fermentations. Values not corrected for evaporation losses which are less than 10%.

EXAMPLE 4

Five fermentations are carried out using the same conditions specified in Example 1 except that Chatham 1950 molasses are used in each case and the proportions of ferrocyanide, phosphate, and inoculum are varied. With fermentations Nos. 1 and 2, the potassium ferrocyanide is added to the seed mash in the proportion of 0.3 gm. per litre, and the inoculum is added to the main mash in a proportion of 1.6% by volume. In fermentation No. 3, the potassium ferrocyanide is added to the seed mash in a proportion of 0.5 gm. per litre and the inoculum is added to the main mash in the proportion of 2.0% by volume. In fermentations Nos. 4 and 5, the potassium ferrocyanide is added to the seed mash in the proportion of 0.7 gm. per litre and the inoculum is added to the main mash in the proportion of 4.0% by volume. In all five fermentations, 0.5 gm. of the potassium ferrocyanide are added per litre of the main mash and 0.5 gm. per litre of the potassium phosphate are added to both the seed mash and the main mash. The results obtained are shown in the following table.

Table III [a]

| No. | Time | Total acid as citric acid | Anhydrous citric acid | Conversion of available sugar to anhydrous citric acid, percent | Sugar utilized, percent |
|---|---|---|---|---|---|
| 1 | 70 | 9.3 | 8.9 | 68 | 97.1 |
| 2 | 70 | 9.7 | 9.3 | 72 | 96.2 |
| 3 [b] | 65 | 8.5 | 8.2 | 63 | 91.7 |
| 4 | 88½ | 8.3 | 7.8 | 60 | 88.0 |
| 5 | 88½ | 7.5 | 7.4 | 57 | 90.2 |

[a] All values corrected for evaporation.
[b] This fermentation frothed over to some extent and evaporation could not be determined. The average evaporation was used in the calculations.

This example illustrates that increasing the proportion of potassium ferrocyanide, which tends to decrease the rate of growth and decrease the number of prepellets, necessitates, for optimum results, a corresponding increase in the proportion of inoculum to counteract said tendency.

I claim:

1. A process for the production of citric acid by submerged fermentation comprising preparing a seed mash by diluting molasses with water, adjusting the pH to 5–8, treating with a water soluble ferrocyanide with heat, and cooling; preparing an inoculum by inoculating the seed mash with spores of a citric acid producing and accumulating organism and allowing to incubate with agitation in the presence of air to effect a primary growth of the organism at least until the spores have germinated; preparing a main mash by diluting molasses, adjusting the pH to 6–9, treating with a water soluble ferrocyanide with heat, and cooling; adding at least a portion of said inoculum to the main mash; dispersing air throughout the main mash to effect a secondary growth of the organism until suitable for citric acid producing and accumulating fermentation; and then dispersing oxygen throughout the main mash whereby growth is retarded and citric acid producing and accumulating fermentation is obtained.

2. A process as claimed in claim 1 in which the precipitate caused by each ferrocyanide treatment is retained in the respective mash during the process.

3. A process as claimed in claim 1 in which molasses is beet molasses.

4. A process as claimed in claim 1 in which the citric acid producing organism is *Aspergillus niger*.

5. A process for the production of citric acid by submerged fermentation comprising preparing a seed mash by diluting molasses with water to a concentration of 8–20% sugar by weight, adjusting the pH to 5–8, treating with a water soluble ferrocyanide in conjunction with a temperature of at least 80° C. and cooling; preparing an inoculum by inoculating the seed mash with spores of a citric acid producing and accumulating organism and allowing to incubate with agitation in the presence of air to effect a primary growth of the organism at least until the spores have germinated; preparing a main mash by diluting molasses to a concentration of 8–20% sugar by weight, adjusting the pH to 6–9, treating with a water soluble ferrocyanide in conjunction with a temperature of at least 80° C., and cooling; adding at least a portion of said inoculum to the main mash; effecting a fine dispersion of air throughout the main mash to effect a secondary growth of the organism until suitable for citric acid producing and accumulating fermentation; and then effecting a fine dispersion of oxygen throughout the main mash whereby growth is retarded and citric acid producing and accumulating fermentation is obtained.

6. A process as claimed in claim 5 in which the water soluble ferrocyanide is potassium ferrocyanide.

7. A process as claimed in claim 5 in which the ferrocyanide is added to each mash in the proportion of 0.15–0.5 gm. of the ferrocyanide ion per litre of mash.

8. A process as claimed in claim 5 in which the main mash is oxygenated prior to addition of the inoculum.

9. A process as claimed in claim 5 in which a water soluble phosphate is added to each mash prior to inoculation.

10. A process as claimed in claim 5 in which the citric acid producing organism is *Aspergillus niger*.

11. A process for the production of citric acid by submerged fermentation comprising preparing a seed mash by diluting beet molasses to a concentration of 8–20% sugar by weight, adjusting the pH to 5–8, adding 0.26–0.87 gm. of potassium ferrocyanide (calculated on the anhydrous basis) per litre of mash, sterilizing under heat, and cooling; preparing an inoculum by inoculating the seed mash with spores of *Aspergillus niger* and allowing to incubate with agitation in the presence of air to effect a primary growth of the organism at least until the spores have germinated; preparing a main mash by diluting beet molasses to a concentration of 8–20% sugar by weight, adjusting the pH to 6–9, adding 0.26–0.87 gm. of potassium ferrocyanide (calculated on the anhydrous basis) per litre of mash, sterilizing under heat and cooling; adding up to 10% by volume of said inoculum to the main mash; effecting a secondary growth of the organism by providing a fine dispersion of air throughout the main mash for 18–30 hours at 20–35° C.; and then providing a fine dispersion of oxygen throughout the main mash whereby growth is retarded and citric acid producing and accumulating fermentation is obtained.

12. A process as claimed in claim 11 in which, in the preparation of each mash, the pH is re-adjusted after sterilization to within the range stated for each mash.

13. A process as claimed in claim 11 in which the aeration and oxygenation together last 60–80 hours starting from the addition of the inoculum to the main mash.

14. A process as claimed in claim 11 in which the precipitate formed in each mash by the addition of the potassium ferrocyanide is retained in the respective mash during the process.

15. A process as claimed in claim 11 in which $6-10 \times 10^8$ spores are added for every 300 ml. of seed mash.

16. A process as claimed in claim 11 in which, in the preparation of the inoculum, the incubation is effected for 18–30 hours at 20–35° C.

17. A process for the production of citric acid by the submerged fermentation comprising: (1) preparing a vegetative inoculum by germinating spores of a citric acid producing and accumulating organism in a seed mash containing an aqueous solution of molasses and of a water soluble ferrocyanide; (2) transferring at least part of said inoculum to a main mash and aerating the mash until the organism has grown sufficiently for citric acid producing and accumulating fermentation; (3) ceasing aeration and commencing oxygenation of said main mash whereby growth is retarded and citric acid producing and accumulating fermentation is obtained.

References Cited in the file of this patent

UNITED STATES PATENTS

| | | |
|---|---|---|
| 2,353,771 | Szucs | July 18, 1944 |
| 2,394,031 | Waksman | Feb. 5, 1946 |
| 2,400,143 | Waksman | May 14, 1946 |

OTHER REFERENCES

Shu et al.: Industrial and Engineering Chemistry, vol. 40, No. 7, 1948, pages 1202 to 1205.